United States Patent
Weil et al.

(10) Patent No.: US 11,418,822 B2
(45) Date of Patent: *Aug. 16, 2022

(54) PLAYER METHODS FOR CHUNKED CMAF LOW LATENCY PLAYBACK

(71) Applicant: Amazon Technologies, Inc., Seattle, WA (US)

(72) Inventors: Nicolas Weil, Paris (FR); Lionel Bringuier, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,050

(22) Filed: Oct. 26, 2020

(65) Prior Publication Data
US 2021/0099739 A1 Apr. 1, 2021

Related U.S. Application Data

(63) Continuation of application No. 15/970,771, filed on May 3, 2018, now Pat. No. 10,820,022.

(51) Int. Cl.
| | |
|---|---|
| *H04N 21/2343* | (2011.01) |
| *G06N 5/00* | (2006.01) |
| *H04N 21/2387* | (2011.01) |
| *H04N 21/234* | (2011.01) |
| *G06F 3/06* | (2006.01) |

(52) U.S. Cl.
CPC ..... *H04N 21/234345* (2013.01); *G06N 5/003* (2013.01); *H04N 21/2387* (2013.01); *H04N 21/23406* (2013.01); *G06F 3/0638* (2013.01)

(58) Field of Classification Search
None
See application file for complete search history.

(56) References Cited

U.S. PATENT DOCUMENTS

| | | | |
|---|---|---|---|
| 8,712,978 B1 | 4/2014 | Shilane et al. | |
| 10,237,195 B1 | 3/2019 | Karach et al. | |
| 10,432,982 B2* | 10/2019 | Sun | .............. H04N 21/2353 |
| 10,820,022 B1 | 10/2020 | Weil et al. | |
| 2006/0110131 A1 | 5/2006 | Okauchi et al. | |
| 2013/0042015 A1* | 2/2013 | Begen | .................. H04N 19/46 |
| | | | 709/231 |
| 2013/0290493 A1* | 10/2013 | Oyman | ............... H04B 7/0639 |
| | | | 709/219 |
| 2021/0289013 A1* | 9/2021 | Bentaleb | ........... H04L 65/4069 |
| 2021/0306703 A1* | 9/2021 | Stockhammer | .... H04N 21/4383 |

OTHER PUBLICATIONS

Weil, N., and R. Bouqueau, Ultra Low Latency With CMAF, Paris Video Tech Meetup #4, Jul. 2017, 11 pages.

* cited by examiner

*Primary Examiner* — Heather R Jones
(74) *Attorney, Agent, or Firm* — Knobbe, Martens, Olson & Bear, LLP

(57) ABSTRACT

A content streaming system and methodology for facilitating the management of content streaming. A video packaging and origination service provides streaming content that is organized according to a set of encoded content chunks. A video playback application processes the set of encoded content chunks to dynamically form a content segment for live video streaming. The video playback application further processes the set of encoded content chunks to apply framerate heuristics associated with encoded content segments.

20 Claims, 10 Drawing Sheets

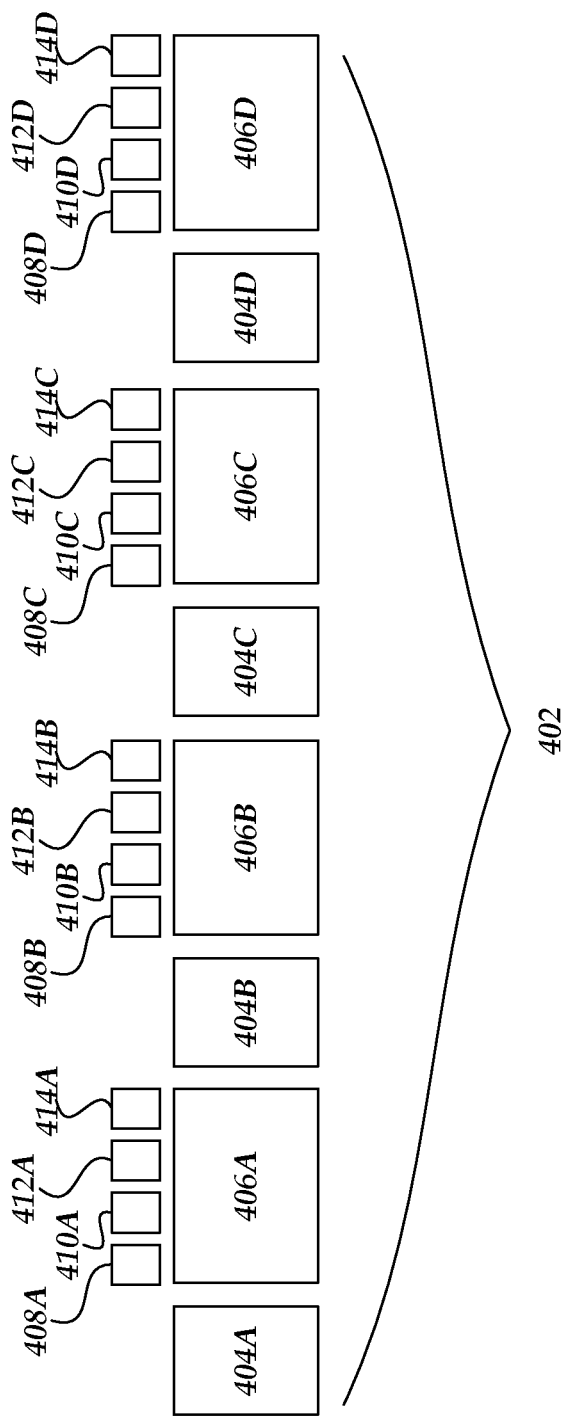

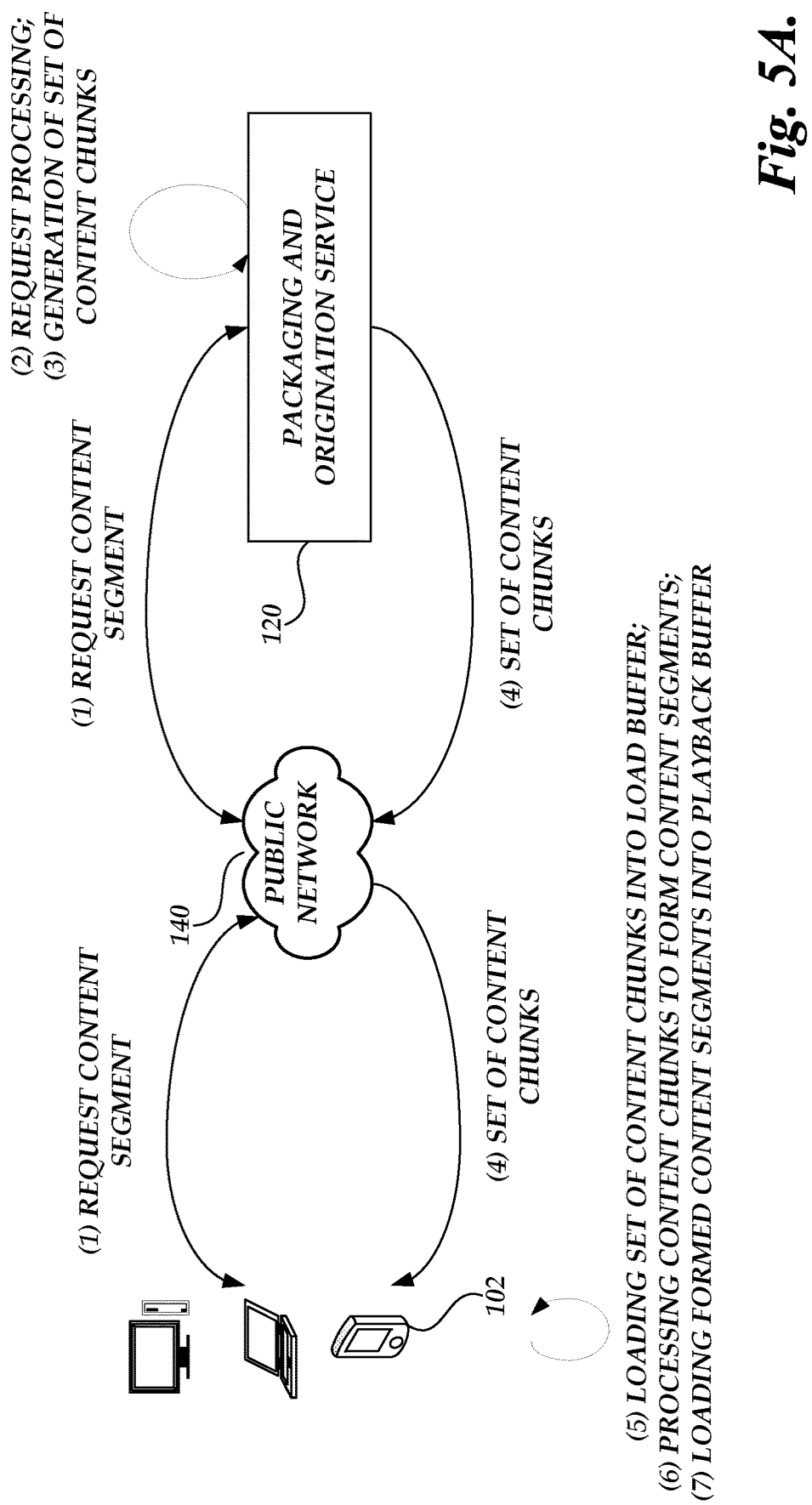

PLAYER METHODS FOR CHUNKED CMAF LOW LATENCY PLAYBACK

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4 is a block diagram illustrative of the representation of a portion of an encoded content segment utilizing encoded content fragments and encoded content chunks in accordance with an illustrative embodiment;

FIGS. 5A-5B are block diagrams of the content delivery environment of FIG. 1 illustrating the interaction between a video packing and origination service and user device for obtaining encoded content.

DETAILED DESCRIPTION

Figure 1:
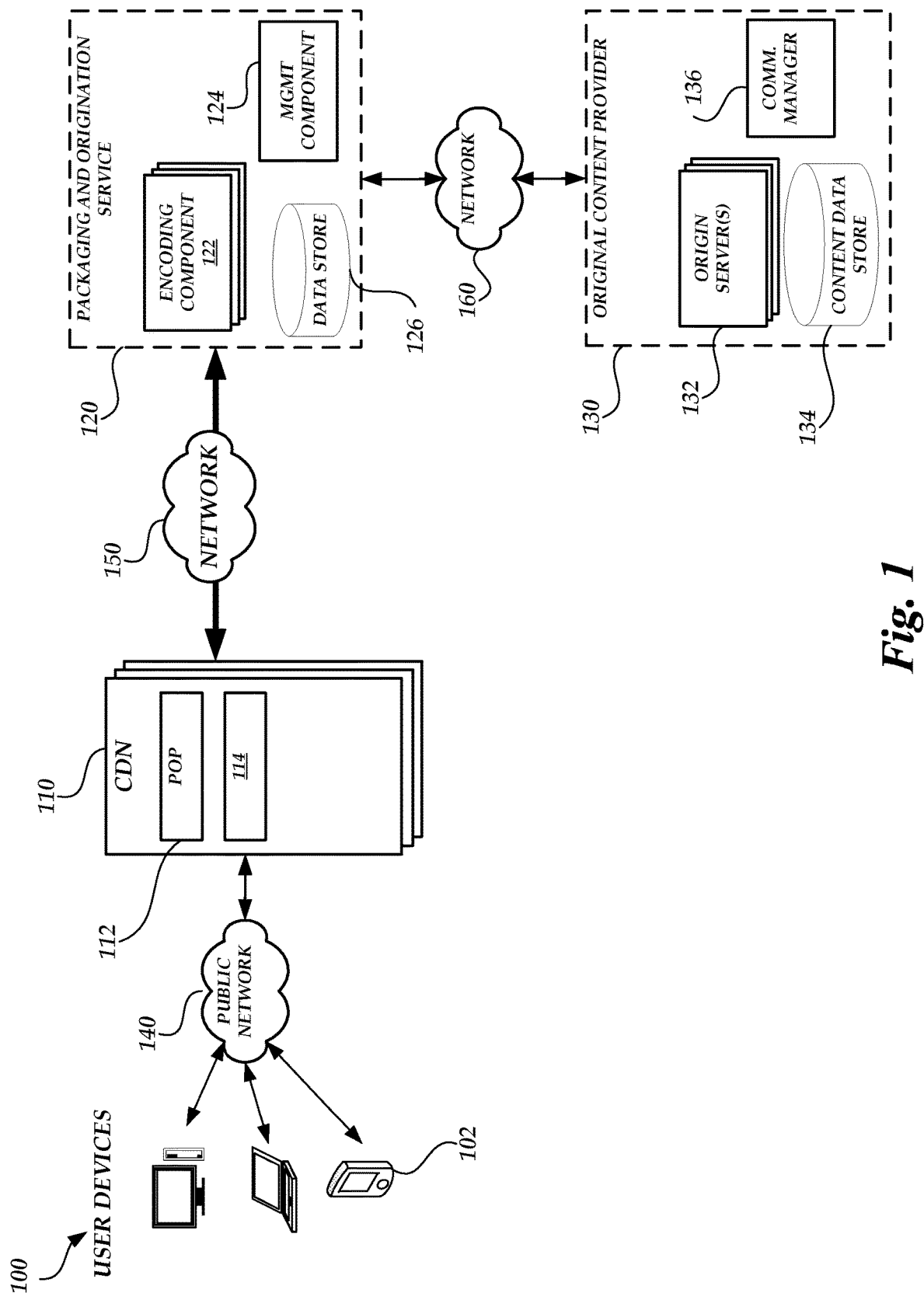
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices, segment by segment. For example, in a video stream, each segment typically accounts for 2-10 seconds of video rendered on a receiving device. To provide content, the video packaging and origination service can encode individual content segments and transmit the encoded segments to requesting user devices directly or via a CDN. Typically, the video packaging and origination service will complete the encoding of the segments prior to transmission.

In some embodiments, a video player on the user device may be configured to receive a buffer a number of encoded segments prior to beginning the rendering of the content segments on the user device. For example, a user device may be configured to buffer three or four segments prior to beginning playback. Accordingly, by way of illustrative example, if content segments are associated with 10 second intervals, the player device would incur a latency of the product of the length of the content segment and the number of buffered segments (e.g., 10 second segments*3 segments buffered=30 seconds of latency). Such latencies for live streaming events affect overall performance of the user device or user experience.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file by applying heuristic rules that define request behavior for media segment requests.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include encoding formats in which encoded content can be processed and transmitted in a set of segments. Such encoding formats include, but are not limited to, the motion pictures expert group ("MPEG) MPEG-2 Part 2, MPEG-4 Part 2, H.264 (MPEG-4 Part 10), H.265 high efficiency video coding ("HEVC"), VP9, and AOMedia Video 1 ("AV1"), and the like.

In addition to incorporating segmenting of video segments, in some embodiments, content providers can further subdivide video segments to reduce latency. For example, in applications related to live or substantially live video streaming, a content provider can look to minimize latency by further processing video segment data. For example, in accordance with one approach, such as found in the Common Media Application Format ("CMAF"), content segments can be broken down into a plurality of media fragments that can be transmitted to form video segments. Still further, individual media fragments can be further broken down into a plurality of sub portions, or chunks, that can be utilized to form the media fragments. The individual media segment chunks can be transmitted in accordance with networking protocols, such as HTTP, the support the transmission of data chunks. Each chunk respectively includes one or more media samples.

Generally, the utilizing of segment fragments and segment chunks can facilitate the reduction of transmission latencies for live streaming events. With reference to the previous example, a 10 second media segment can be broken down into five fragments of two seconds each. Each fragment can be further broken down into 1 second chunks that can be individually transmitted. Additionally, a media player on the user device can begin buffering and playback of the media chunks without incurring latencies associated with buffering an entire media segment. However, such general approaches do not address potential challenges associated with processing buffered media chunks to form the segments. For example, in situations in which the media player experiences a rebuffering event, the media player incurs additional latencies associated with the buffering of full segments. Additionally, such general approaches do not address potential challenges associated with applying heuristic rules that define subsequent segment request behavior for media segment requests. For example, a media player configured with segment-based heuristic rules do not have the ability to utilize fragment or chunk based information to evaluate such heuristic rules.

To address at least a portion of the inefficiencies described above with regard to transmission of encoded content segments, a video segment processing system and method for processing a plurality of encoded content segments transmitted as a plurality of individual encoded segment fragment chunks is provided. More specifically, aspects of the present application correspond to utilization of processing routines for receiving a plurality of a plurality of encoded segment chunks. Illustratively, encoded content is associated with two or more segments. Individual segments are then further organized into a plurality of fragments, which are further organized into a plurality of chunks.

In one aspect, content segments can be dynamically formed when needed based on receiving a set of encoded chunks that can correspond to one or more segments, storing the received set of encoded chunks in a load buffer, and processing the load buffer of received chunks. The processing of the load buffer includes the identifier of a marker associated with a start of a segment to facilitate the formation of a segment and the discarding of chunks occurring prior to the identifier marker and associated with a previous segment.

In another aspect, heuristics rules can be applied to the received encoded segment chunks to manage subsequent transmissions of encoded data. More specifically, the heuristic rules can correspond to a comparison of effective framerate buffer and chunk framerate. If the effective framerate buffer exceeds the chunk framerate, the input buffer can write to the playback buffer (e.g., the effective buffer framerate) faster than the receipt and processing of the encoded chunks. Accordingly, the media player can request superior or higher bitrate transmission. If the effective framerate buffer doesn't exceed the chunk framerate, the input buffer cannot write to the playback buffer (e.g., the effective buffer framerate) faster than the receipt and processing of the encoded chunks. Accordingly, the media player can request inferior or lower bitrate transmission. Other aspects of the present application will also be described herein.

Although aspects of the present application will be described with regard to illustrative examples related to specific bitrate encoding, encoding formats and combinations of bitrate encoding and formats as well as encoded segment fragment and chunking algorithms, one skilled in the relevant art will appreciate that the examples are illustrative in nature and should not be construed as limiting. Still further, illustrative examples will be discussed with regard to specific data structures or rules specified by the International Organization for Standardization ("ISO") and the International Electrotechnical Commission ("IEC") technical standards, and in particular to one or more versions of the ISO Base Media File Format defined in ISO/IEC 14496-12. Reference to the ISO/IEC standards is intended solely to be illustrative and should not be construed as limiting to any particular standard, version of the standard, or respective data structure.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. Additionally, as will be described in greater detail below, the encoded content segments can be further processed in accordance with additional communication protocols, such as the common media application format ("CMAF"). The content can be illustratively provided by one or more origin sources, such as original content provider 130.

User devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each user device 102 may optionally include one or more data stores (not shown in FIG. 1) including various applications or computer-executable instructions, such as web browsers or media player software applications, used to implement the embodiments disclosed herein. As will be explained in greater detail below, the applications can be configured to process encoded content segments organized according to fragments and chunks. Illustrative components of a user device 102 will be described with regard to FIG. 2.

In some embodiments, a CDN service provider 110 may include multiple edge locations from which a user device can request content. Individual edge locations 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, in some embodiments the POP 112 can include one or more media processing components 114 for processing processed encoded content streams as will be described herein. For example, individual POPs may receive processed, encoded contents streams and be able to transmit or incorporate additional fragments and chunking algorithms as described herein utilizing a media processing component 114. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, the video packaging and origination service 120 includes one or more servers for receiving content from original content providers 130 and processing the content to make available a set of received encoded bitrate segments. As described in further detail below, the video packaging and origination service 120 includes a plurality of encoding components 122 utilized to transmit encoded data streams to the user devices 102. The video packaging and origination service 120 also includes one or more servers for receiving content requests for a requesting entity, such as a POPs 112 or user devices 102 and generating encoded, processed content streams as described herein. The encoding components 122 may be distributed according to geographic criteria or availability zones to facilitate delivery or access to encoded content. Still further, although illustrated as separate components, the encoding components 122 may be integrated into a single component that functions as a combined ingress and egress component for receiving and distributing encoded content from the video packaging and origination service 120.

The video packaging and origination service 120 can further include management services 124 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 126 for maintaining generated encoded data for transmission to the user devices 102 and CDN service provider 110.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the video packaging and origination service 120 as being implemented in multiple geographic areas. Additionally, not all geographic areas hosting portions of the video packaging and origination service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the video packaging and origination service 120. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The original content provider 130 can further include a data store 134 for maintaining encoded data for transmission.

Figure 2:
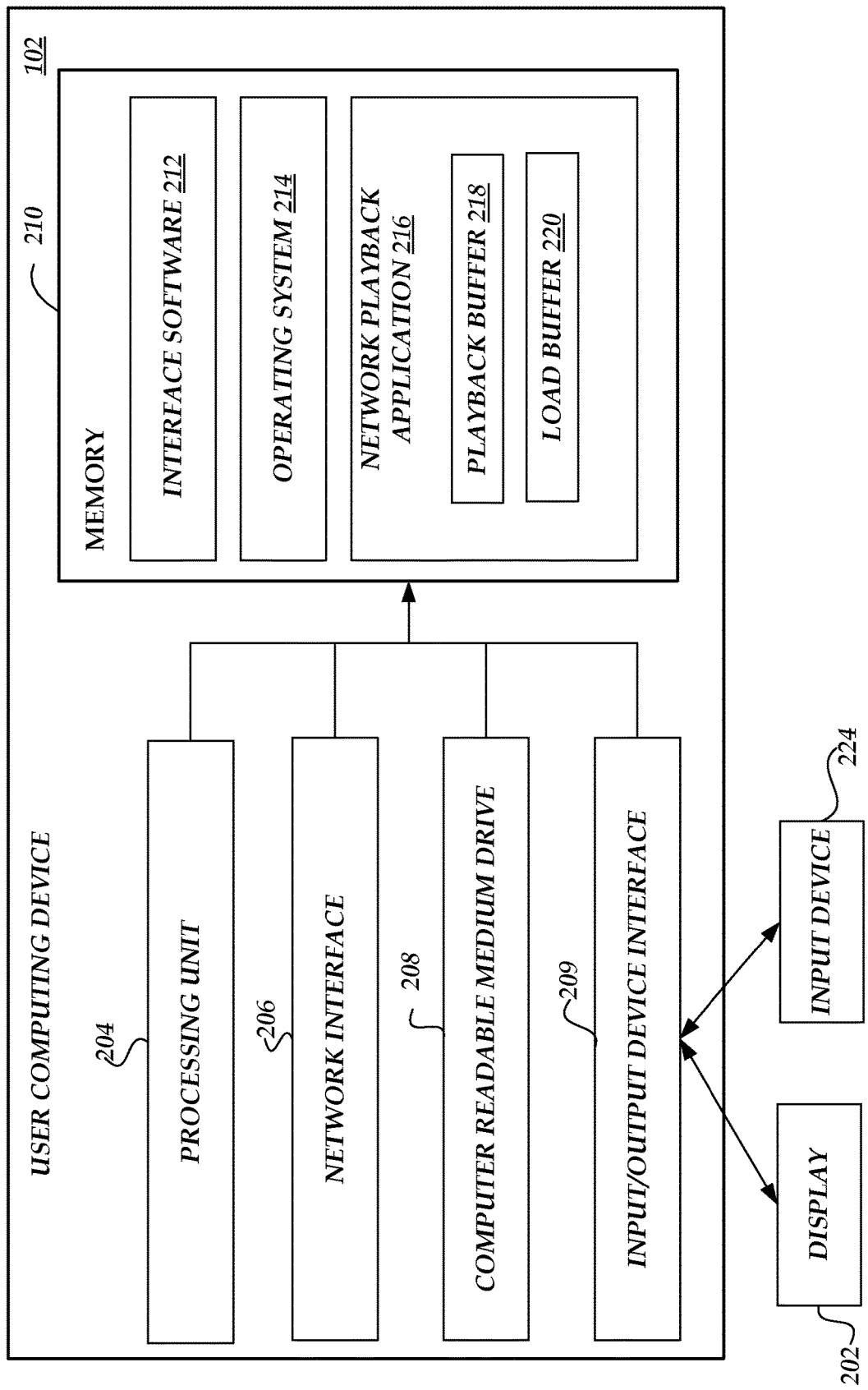
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process encoded content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120, the CDN service provider 110, or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the video packaging and origination service 120. Additionally, in some embodiments, the memory 210 can include a media processing component 218 for processing processed, encoded content streams and reconstituting one or more content streams as described herein. Included in the media processing component 218 are a loading buffer for receiving chunks and a playback buffer for use in rendering content on the user devices. Aspects of the utilization of the two buffers will be described in greater detail below. Additionally, as described below, one or more aspects of the present application relate to managing encoded content segments transmitted to the media processing component utilizing encoded media fragments and encoded media chunks, such as in accordance with CMAF.

Figure 3:
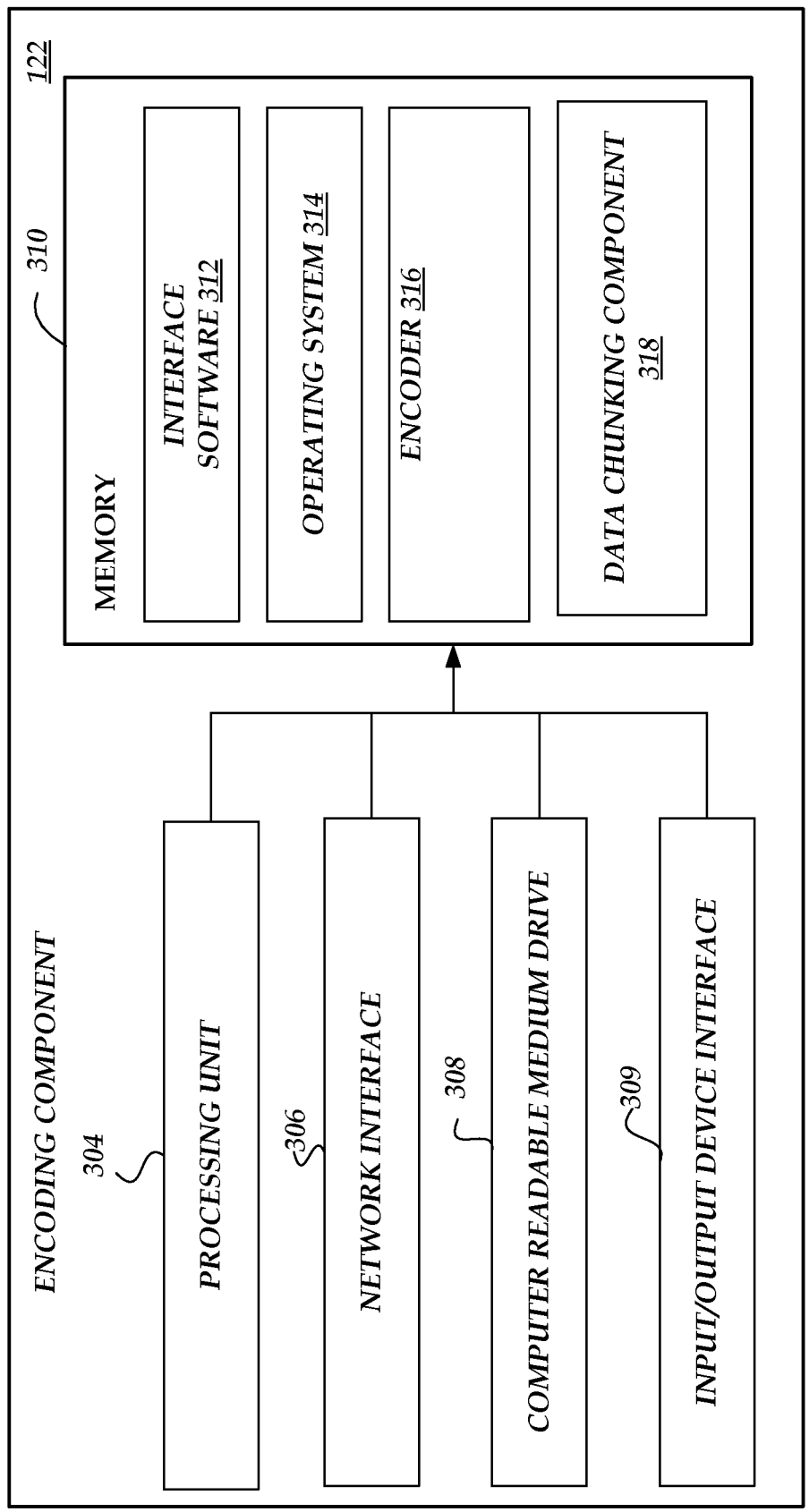
FIG. 3 is a block diagram of illustrative components of a content encoding component configured to manage and transmit encoded content to requesting entities in accordance with an illustrative embodiment.

FIG. 3 depicts one embodiment of an architecture of an illustrative server for functioning as an encoding component 122 as described herein. As described above, the video packaging and origination service 120 includes multiple encoding components 122 (or nodes) that facilitate processing encoded segment content requests from different requesting entities, such as CDN service provider 110 or user devices 102. The general architecture of the encoding component 122 depicted in FIG. 3 includes an arrangement of computer hardware and software components that may be used to implement aspects of the present disclosure. As illustrated, the encoding component 122 includes a processing unit 304, a network interface 306, a computer readable medium drive 308, and an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 140 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the encoding component 122. The memory 310 may further include computer program instructions and other information for implementing aspects of the present disclosure. For example, in one embodiment, the memory 310 includes interface software 312 for receiving and processing content requests from requesting entities. Additionally, the memory 310 includes an encoding component 316 for generating encoded content segments. Additionally, the encoding component 122 can further include a data chunking component 318 that generates processed, encoded components into fragments and chunk based on the encoded content segments provided by the encoding component 316 as described herein. By way of illustrative example, the data chunking component 318 can facilitate the generation of encoded chunks in accordance with CMAF. Additionally, although data chunking component 318 is illustrated as a module to the encoding component 122, the data chunking component may be implemented as a stand-alone application in the video packaging and origination service 120.

As previously described, in accordance with embodiments of the present application, encoded content for streaming can be subdivided into a set of segments transmitted and rendered by a media processing application on the user device 102. Examples of such an approach can correspond to the DASH and HLS communication protocols. To mitigate latencies associated with the live streaming, the encoded segments can be further broken into a plurality of encoded content fragments that sum up to individual segments. Additionally, individual fragments can be further broken down or sub-divided into encoded content chunks that sum up to individual fragments. An illustrative example of a communication protocol that facilitates such interaction corresponds to the CMAF communication protocol.

With reference now to FIG. 4, a block diagram 400 illustrative of the representation of a portion of an encoded content segment utilizing encoded content fragments and encoded content chunks will be described. The block diagram 400 represents a single fragment 402 that with other fragments make up an encoded content segment. By way of illustration, the fragment 402 is made up of three chunks. Illustratively, individual chunks are made up of a first portion, such as a Movie Fragment Box ("moof"), followed by one or more payload portions, such as Media Data Boxes ("mdat") portions. Illustratively, the first portion of the chunks includes information that identifies one or more aspects of the chunk including the type of data represented by the payload portion, number of media samples included in the payload portions, durations of the samples in the payload samples, timescale information for the media samples, and the like. For example, the first portion can include markers, such as flags or other identifiers, that the payload portion corresponds to a marker or identifier utilized to delineate information between two or more segments. For example, the payload portion can include an Instantaneous Decoding Refresh ("IDR") marker that is interpreted as a frame in which no frame subsequent to the IDR marker can reference a previous frame prior to the IDR marker.

As illustrated in FIG. 4, each of the three chunks include a first portion 404A, 404 B, 404 C. As will be described below, information from the first portions can be utilized to form an initial encoded content segment from a set of received content chunks. Additionally, information from the first portions can also be utilized to allow for the utilization of segment-based heuristics for a set of received encoded content chunks. With continued reference to FIG. 4, each of the chunks of the fragment 402 includes a payload portion 406B, 406C, 406D. Each of the payload portions includes a plurality of media samples 408, 410, 412, and 414 (A-D).

Figure 5B:
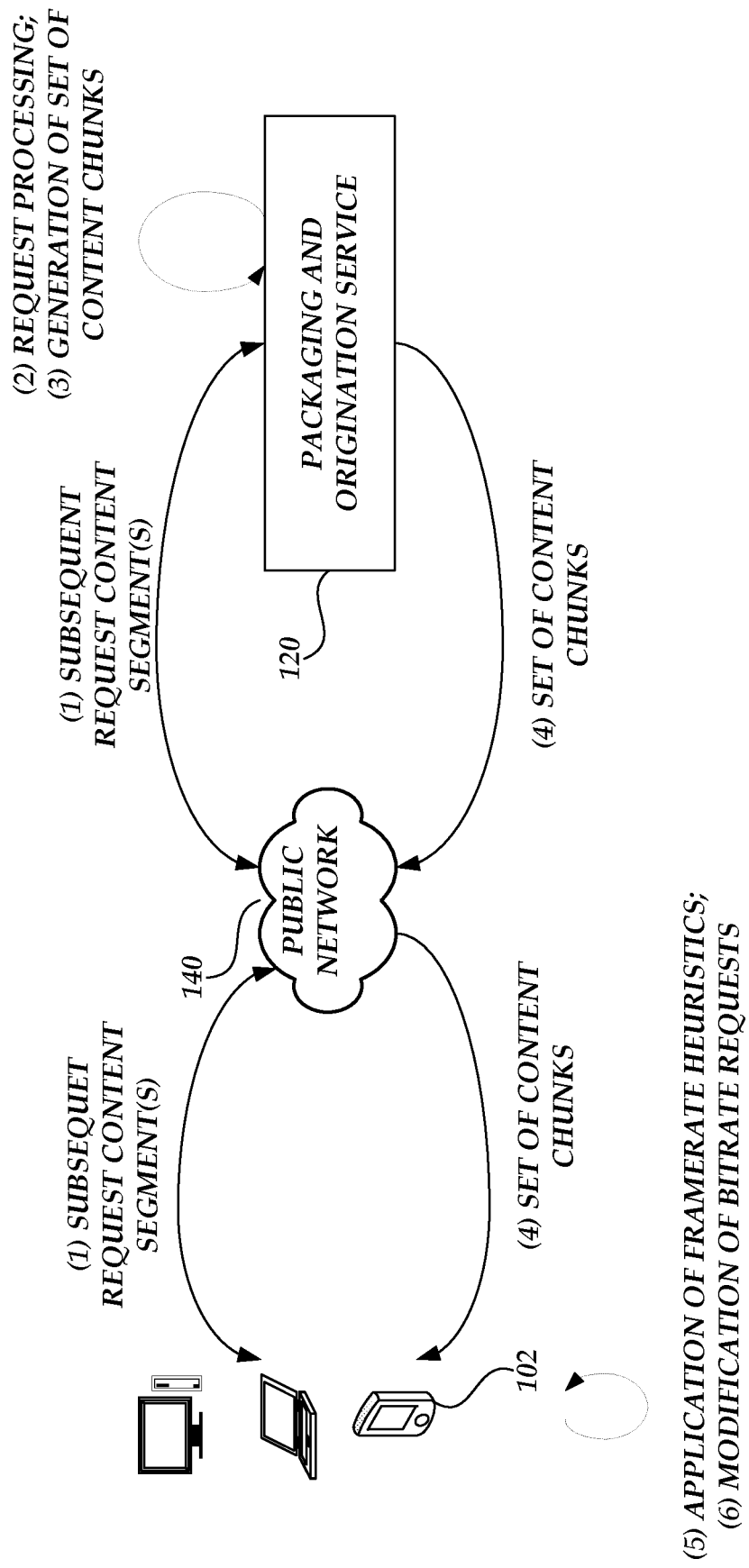

Turning now to FIGS. 5A-5B, an illustrative interaction for the processing of encoded content segments utilizing encoded content fragments and chunks will be described. FIGS. 5A and 5B will be illustrated with regard to interaction between a user device 102 and a video packaging and origination service 120. However, the user device 102 may interact similarly with a CDN service provider 110. With reference first to FIG. 5A, embodiments for the dynamic formation of content segments from a set of encoded content fragments and chunks will be described. At (1), the user device 102, such as through the media processing component 218, transmits one or more requests for a content segment. Illustratively, the request corresponds to specific bitrate and format that is available from the video packaging and origination service 120.

At (2), the video packaging and origination service 120 processes the received encoded segment requests to allow the video packaging and origination service 120 to generate outgoing content streams. Illustratively, the processing of the request can include a number of additional interactions between the user device 102 and the video packaging and origination service 120, including security protocols, handshaking protocols, and the like. At (3), the video packaging and origination service 120, through encoding component 122, generates a set of encoded content chunks, such as in accordance with the CMAF communication protocol. At (4), the video packaging and origination service 120 transmits the set of encoded content chunks to the user device. Illustratively, as described above, the transmission of the encoded content chunks can leverage network protocols, such as HTTP, that facilitate the distribution of data chunks over a communication network.

In one aspect of the present application, the user device 102 receives the chunks and attempts to form content segments in a manner such that there is a reduction in latency that would otherwise be associated with the transmission of data segments. More specifically, in some scenarios, such as related to rebuffering or refreshing of the content channel, the user device 102 attempts to dynamically form segments from the received encoded chunks. At (5), the user device 102 stores the received encoded chunks in a load buffer. At (6), the user device 102 processes the set of chunks in the load buffer to form an initial segment. Illustratively, the user device 102 parses the set of chunks to identify a marker in the chunk information that is indicative of a reference frame, such as an IDR marker or flag. The user device 102 can utilize the found marker to identify the start of a next segment and utilize the following chunks to dynamically form the segment. Additionally, the user device 102 can then discard any chunks received prior to the chunk with the identified marker as these chunks will not form part of the segment. Illustratively, by dynamically forming segments from received encoded chunks, the user device 102 can provide the dynamically formed segments to the playback buffer in a manner to avoid latencies or delay. Such approaches are particularly relevant for live streaming or substantially live streaming events. At (7), the user device 102 appends the formed initial segment into the playback buffer to facilitate the lower latency streaming of content.

With reference to FIG. 5B, in another aspect of the present application, the user device can also evaluate segment-based heuristics based on information include in the received set of encoded chunks. At (1), the user device 102 and video packaging and origination service 120 illustratively engage in an interactive exchange related to requesting inferior or lower or superior or higher bitrate combination for subsequent requested segments. Accordingly, the user device 102 continues to transmit requests for encoded content segments, which can be modified based on heuristics of the previously received encoded content segments (transmitted as encoded content chunks). At (2), the video packaging and origination service 120 processes the received encoded segments to allow the video packaging and origination service 120 to generate outgoing content streams. Illustratively, the processing of the request can include a number of additional interactions between the user device 102 and the video packaging and origination service 120, including security protocols, handshaking protocols, and the like. At (3), the video packaging and origination service 120, through encoding component 122, generates a set of encoded content chunks, such as in accordance with the CMAF communication protocol. At (4), the video packaging and origination service 120 transmits the set of encoded content chunks to the user device. Illustratively, as described above, the transmission of the encoded content chunks can leverage network protocols, such as HTTP, that facilitate the distribution of data chunks over a communication network.

At (5), the user device 102 evaluates heuristic rules to determine whether to modify the request for the next encoded content segment. Illustratively, the user device 102 can compare the content chunk framerate of received content chunks with the effective buffer framerate of transferred formed segments from the load buffer to the playback buffer, as will be described below. At (6), the user devices can modify the parameters of the next encoded content segment request based on a comparison of the effective buffer framerate and chunk framerate. The process can then continue for the next requested and received encoded content segment.

Figure 6:
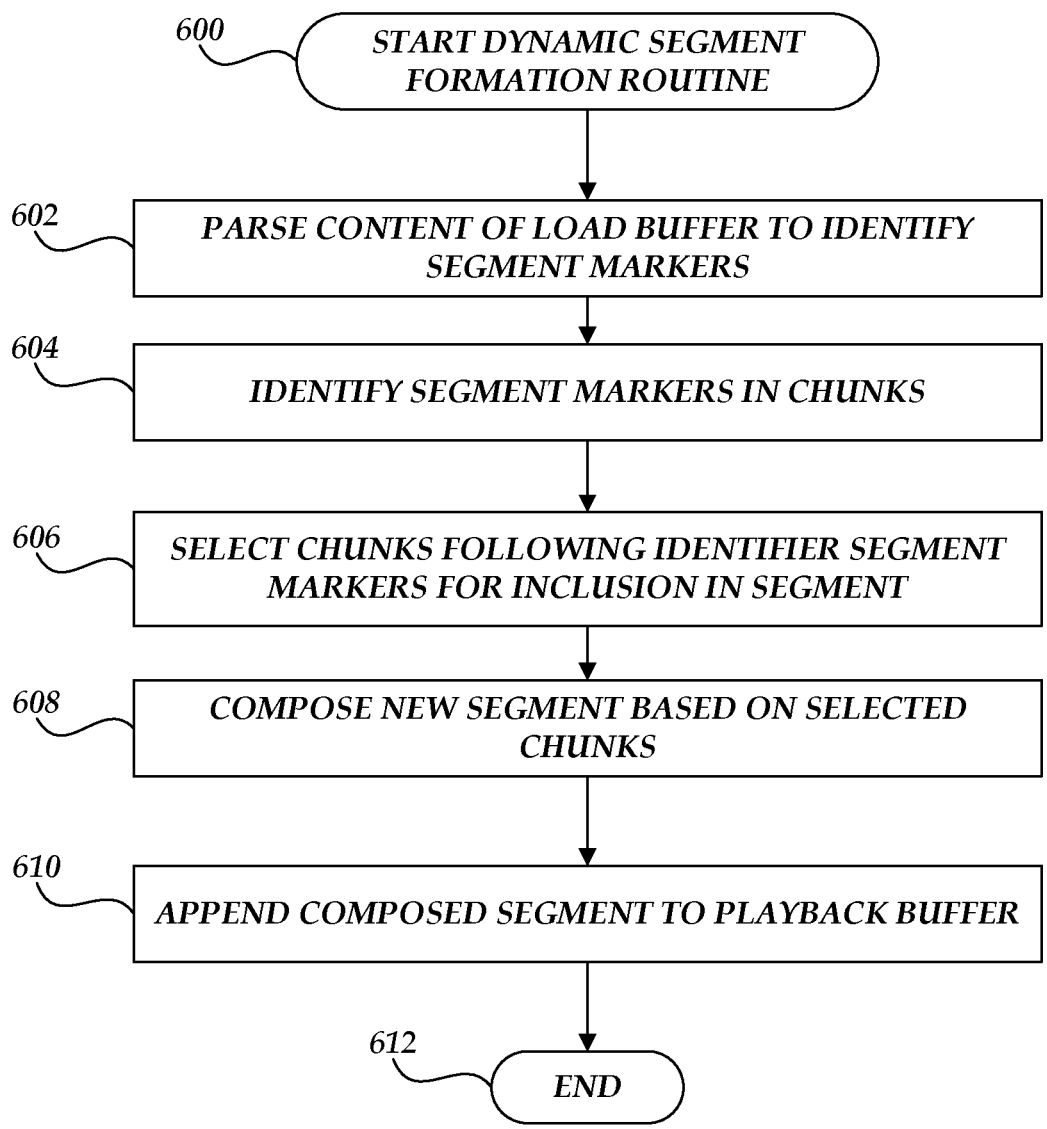
FIG. 6 is a flow diagram illustrative of an initial content segment formation routine implemented by a user device in accordance with an aspect of the present application.

FIG. 6 is a flow diagram illustrative of dynamic content segment formation routine 600 implemented by a user device in accordance with an aspect of the present application. Routine 600 will be described with regard to implementation on a user device, such as by a media processing application. Illustratively, routine 600 may be implemented in scenarios in which the user device 102 attempts to start or re-start playback of a content stream as close to the current time of generation, such as a live streaming event. For example, a user device 101 may experience a rebuffering event for a live streaming event or join a live streaming event in progress. At block 602, the user device 102 parses the set of chunks in the load buffer. At block 604, the user device 102 identifies a marker in the chunk information that is indicative of a reference frame or start of a segment, such as an IDR marker or flag. For example, the chunks can include or be associated with flags or other identifiers that facilitates the identification of an IDR frame. More specifically, in accordance with embodiments associated with the ISO Base Media File Format, sample count information can be defined in a moof box by referencing a "sample_flags" property of a Track Fragment Run Box ("trun") of a Track Fragment Box ("traf") (e.g., moof>traf>trun). As described above, the identification of the IDR marker can be utilized to indicate that the subsequent frames will not reference any frame prior to the IDR frame.

At block 606, the user device 102 can select or identify the chunks immediately following the identified marker to be included in the formed segment. Illustratively, once the chunk having the identified marker is located, the chunk carrying the identified marker and any chunks received subsequent to the identified marker will be utilized to form the segment. At block 608, the user device 102 discards chunks in the set of chunks found prior to the identifier marker as not being part of the initial content segment. At block 610, the user device 102 appends the dynamically formed segment including the identified marker and any identified subsequent chunks into the playback buffer to facilitate the lower latency streaming of content.

Figure 7:
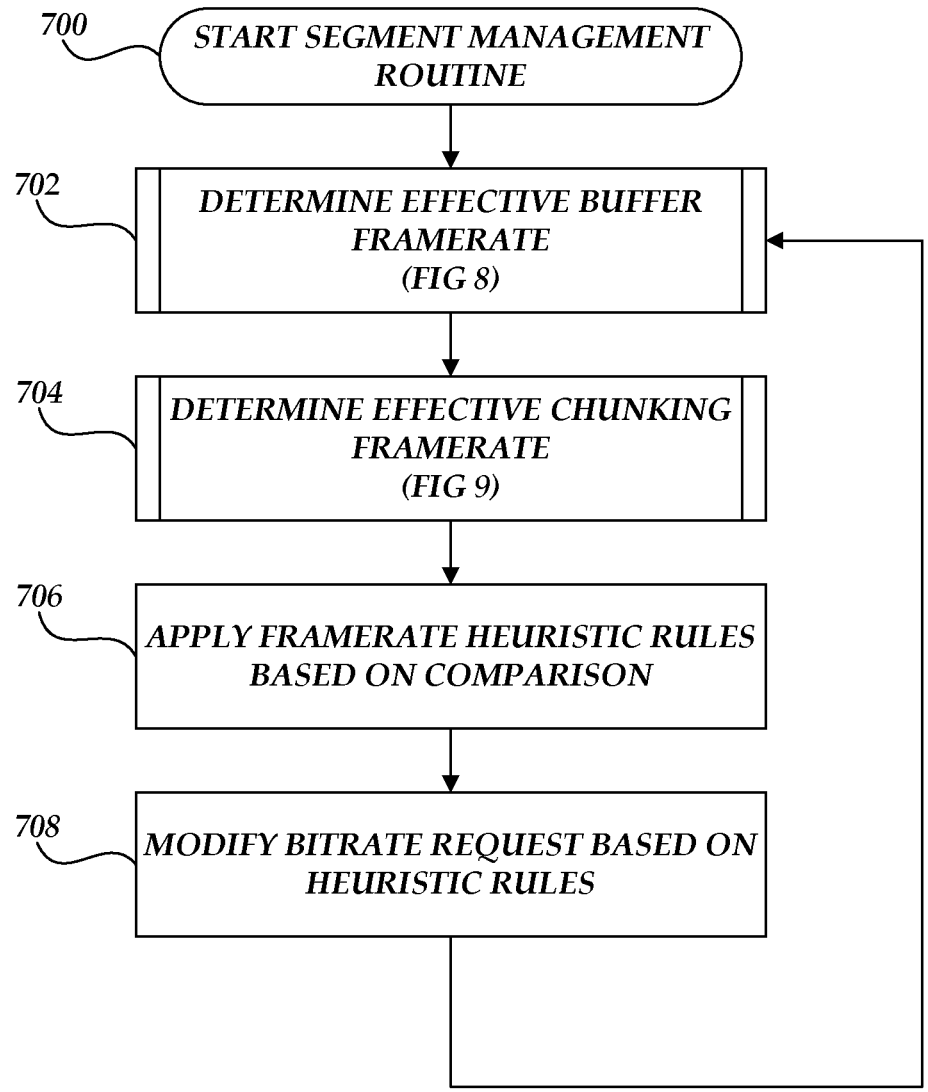
FIG. 7 is a flow diagram illustrative of a segment management processing routine implemented by a user device in accordance with an aspect of the present application.

FIG. 7 is a flow diagram illustrative of a segment management processing routine 700 implemented by a user device in accordance with an aspect of the present application. Routine 700 will be described with regard to implementation on a user device, such as by a media processing application. As previously described, the user device 102 and video packaging and origination service 120 illustratively engage in an interactive exchange related to requesting inferior or lower or superior or higher bitrate combination for subsequent requested segments. Accordingly, the user device 102 continues to transmit requests for encoded content segments, which can be modified based on heuristics of the previously received encoded content segments (transmitted as encoded content chunks). Accordingly, the user device 102 evaluates heuristic rules to determine whether to modify the request for the next encoded content segment.

At block 702, the user device calculates the effective buffer framerate corresponding to the set of received encoded content chunks. A sub-routine 800 for calculating the effective buffer framerate is described below. At block 704, the user device calculates the chunking framerate corresponding to the set of received encoded content chunks. A sub-routine 900 for calculating the chunk framerate is described below.

At block 706, the user device processes heuristic rules associated with a segment based on the effective buffer framerate and the chunk framerate. Illustratively, the user device 102 can compare the content chunk framerate of received content chunks with the effective buffer framerate of transferred formed segments from the load buffer to the playback buffer, as will be described below. More specifically, if the effective buffer framerate is lower than the chunk framerate, the user device is not processing the data sufficiently and the user device will request an inferior or lower bitrate. If the effective buffer framerate is higher than the chunk framerate, the user device is processing the data sufficiently and the user device will request superior or higher bitrate. Additionally, the comparison yields equal or substantially equal framerates (with a defined tolerance), the user device can determine not to make any changes. At block 708, the user device 102 modifies the requested bitrate and the routine 700 returns for continue refinement of the requested bitrate.

Figure 8:
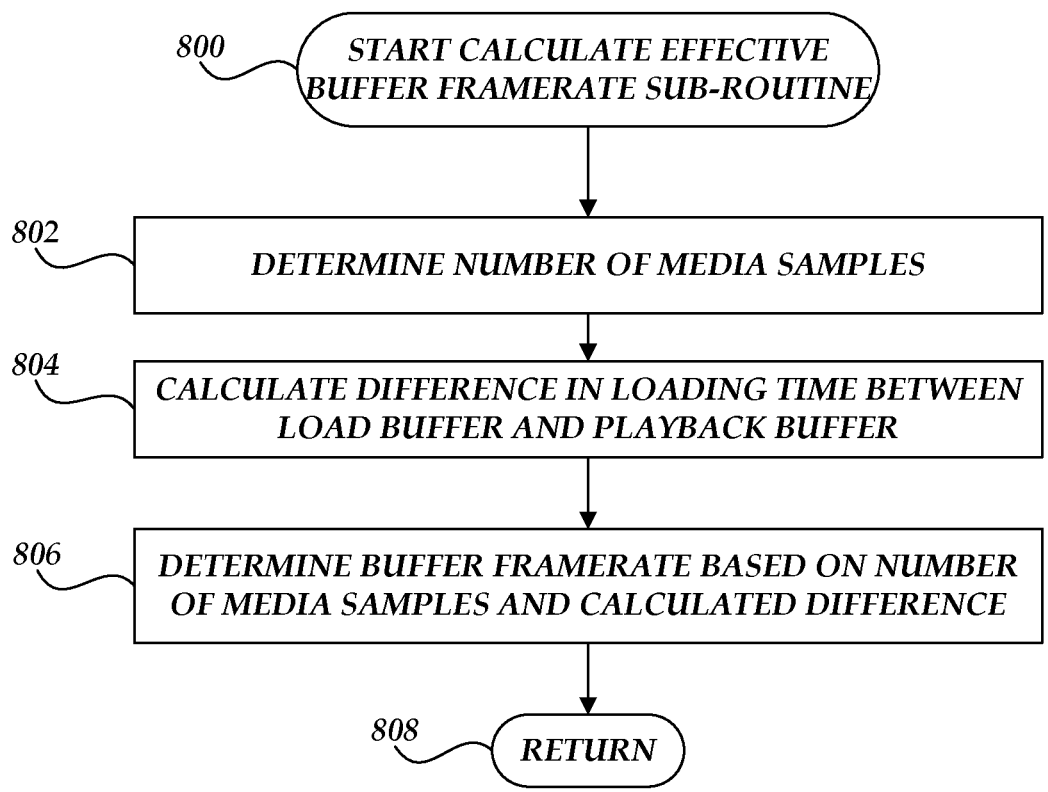
FIG. 8 is a flow diagram illustrative of an effective buffer framerate calculation sub-routine implemented by a user device.

FIG. 8 is a flow diagram illustrative of an effective buffer framerate calculation sub-routine 800 implemented by a user device. Sub-routine 800 will be described with regard to implementation on a user device, such as by a media processing application and corresponds illustratively to block 702 (FIG. 7). At block 802, the user device 102 determines the number of media samples in the payload portion of the chunks. As described above with regard to FIG. 4, the user device 102 can illustratively obtain the information from the first portion of the chunks and sum the value of all the media payloads. More specifically, in accordance with embodiments associated with the ISO Base Media File Format, sample count information for individual mdat boxes can be defined respective moof boxes by referencing a "sample_count" property of a trun box of a traf box ("traf") (e.g., moof>traf>trun). The routine 800 sums all the individual sample count values for all moof boxes in the chunks to be transferred.

Additionally, the user device 102 can further add additional processing for partial payloads or extended payloads in the chunks, such as by adding offsets or storing values in memory. More specifically, in accordance with embodiments associated with the ISO Base Media File Format, various techniques may be implemented depending on the information in the chunks in the buffer. In a first set of examples, additional information from previous buffer transaction may be required to calculate the number of media samples. In one example, if a payload begins in the middle of a moof box, then the current information in the moof box needs to be concatenated with information in memory from a previous buffer transfer to ensure that the sample count, sample duration and sample size information is complete. In another example, if the payload begins at the very begins of an mdat box, the moof box in the memory will need to be parsed in order to obtain the necessary sample count, sample duration and sample size information. In still a further example, if the payload starts in the middle of an mdat box, the number of media samples will correspond to the sample count remaining information included in the previous buffer transfer operation.

In a next set of examples, additional processing may be required for different payload scenarios. In a further example, if a payload does not end at the end of an mdat box but ends with a partial or complete moof box, the user device 102 maintains the moof box in memory for the next buffer transaction. In yet another example, assume a payload does not end at the end of an mdat box, but ends in the middle of an mdat box. If so, the values in the current mdat box needs to be compared with the values of the 'sample_size' property of the preceding trun box (e.g., moof>traf>trun box). A sample_count_override value could then be calculated by adding values until it reaches a value equal or superior to the bytes size of the partial mdat. The sample_count_override would override the value of "sample_count" from the current moof box in the calculation of the number of media samples. Accordingly the value 'sample_count_remaining' would replace the 'sample_count' in the next buffer transfer iteration as sample_count_remaining=sample_count−sample_count_override The preceding moof box also needs to be kept in memory until the next buffer transfer operation, for further parsing.

At block 804, the user device 102 measures or obtains the actual load time from the load buffer to the playback buffer. More specifically, in accordance with embodiments associated with the ISO Base Media File Format, the actual load time corresponds to a measure of the time that was necessary for the media application to load all the moof and mdat boxes that are being transferred from one buffer to another. At block 806, the user device 102 calculates the effective framerate based on the number of media samples in the segment and the measured buffer load time. More specifically, the effective framerate can correspond to a quotient of the number of media samples and the measure buffered load time. Such a calculation can be expressed as:

buffer_loading_framerate=(total_cmaf_media_samples/buffer_actual_loading_time)

At block 808, the sub-routine returns.

Figure 9:
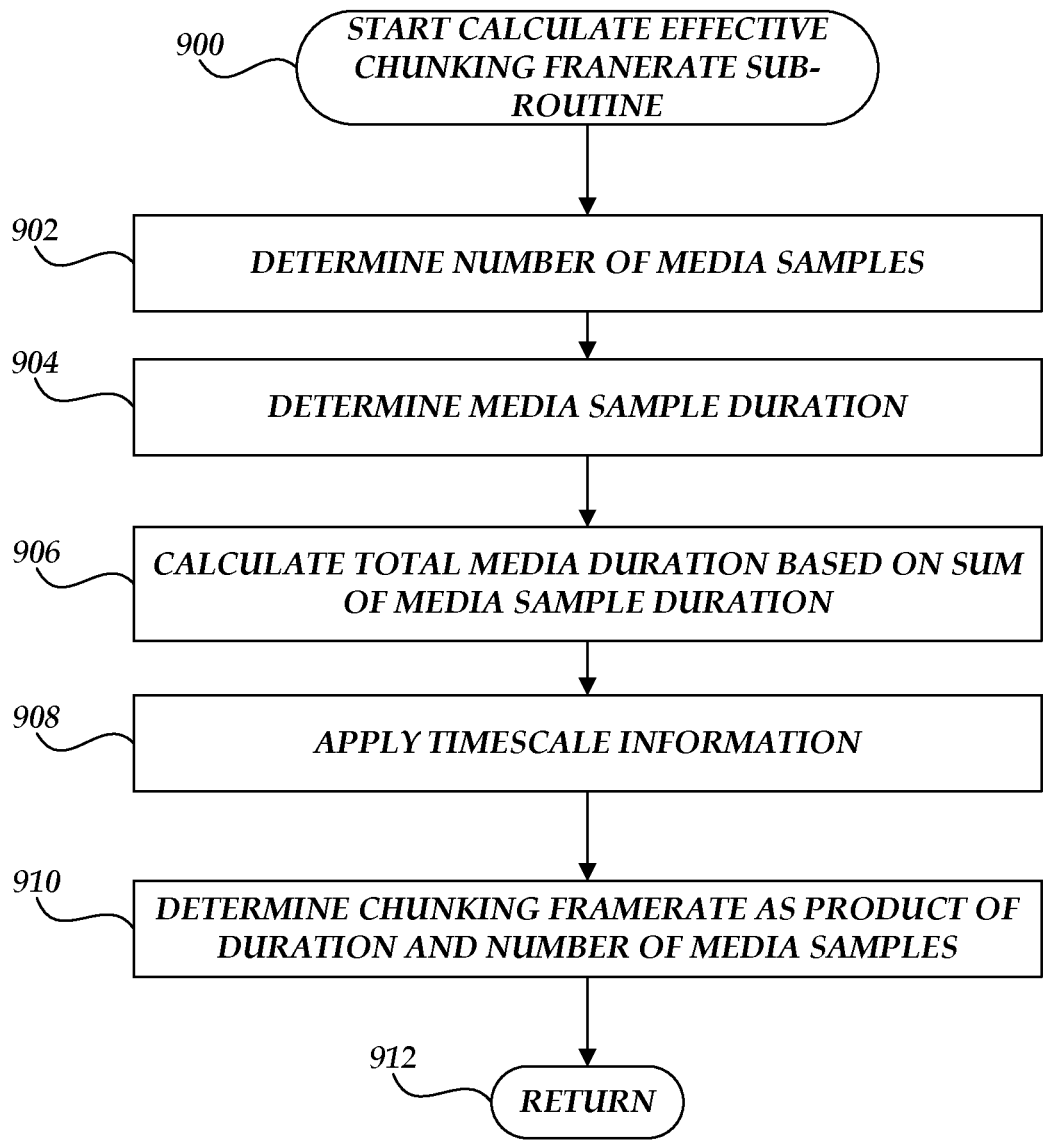
FIG. 9 is a flow diagram illustrative of a chuck framerate calculation sub-routine implemented by a user device.

FIG. 9 is a flow diagram illustrative of a chunk framerate calculation sub-routine 900 implemented by a user device. Sub-routine 900 will be described with regard to implementation on a user device, such as by a media processing application and corresponds illustratively to block 704 (FIG. 7). At block 902, the user device 102 determines the number of media samples in the payload portion of the chunks. As described above with regard to FIG. 4, the user device 102 can illustratively obtain the information from the first portion of the chunks and sum the value of a count of the media samples. Additionally, the user device 102 can further add additional processing for partial payloads or extended payloads in the chunks, such as by adding offsets or storing values in memory. More specifically, in accordance with embodiments associated with the ISO Base Media File Format, in the moof box, the 'sample_count' property of moof>traf>trun box defines how much media samples are contained in the corresponding mdat box.

At block 904, the user device 102 determines a media sample duration. As described above with regard to FIG. 4, the user device 102 can illustratively obtain the information from the first portion of the chunks. More specifically, in accordance with embodiments associated with the ISO Base Media File Format, the 'sample duration' property of moof>traf>trun box defines the duration of each sample in the mdat.

At block 906, the user device sums the value of all the media sample durations and total number of media samples to determine the total chunk duration (e.g., the "cmaf_chunk_duration"). At block 908, the user device normalizes the calculation (e.g., the cmaf_chunk_duration) by dividing by timescale information. In accordance with embodiments associated with the ISO Base Media File Format, the timescale information can be defined in the initialization segment of the chunk track file. More specifically, the timescale information can be found in the Movie Header Box ("moov") by referencing a media declaration ("mdia") of a Track Box ("trak") and identifying the information in the Media Header Box ("mdhd") (e.g., moov>trak>mdia>mdhd). At block 910, the user device 102 determines chunk framerate as the quotient of the sample count by the normalized chunk duration, which can be expressed as:

cmaf_chunk_framerate=(1/cmaf_chunk_duration)
*sample_count.

At block 912, the sub-routine returns the value.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage streaming content comprising:
a computing device with a processor and memory configured to execute a media processing application, wherein encoded content is associated with two or more segments, individual segments of the two or more segments are organized into a plurality of fragments, and individual fragments of the plurality of fragments are organized into a plurality of chunks, the media processing application configured to:
receive a set of encoded content chunks at an initial bitrate in response to a content request, the set of encoded content chunks generated according to a common media application format (CMAF) communication protocol;
process the received set of CMAF generated encoded content chunks to dynamically form at least one content segment;
identify information associated with the processing of the received set of CMAF generated encoded content chunks;
identify characteristics associated with the received set of CMAF generated encoded media chunks;
calculate CMAF processing metrics corresponding to the received set of CMAF generated encoded content chunks based on the identified characteristics associated with the received set of CMAF generated encoded media chunks and the identified information associated with the processing of the received set of CMAF generated encoded content chunks; and
transmit a plurality of subsequent requests for encoded content segments at different bitrates based on the calculated CMAF processing metrics corresponding to the received set of CMAF generated encoded content chunks.

2. The system of claim 1 wherein the CMAF processing metrics comprise an effective buffer framerate and a chunked segment framerate.

3. The system of claim 2 wherein transmitting the plurality of subsequent requests for encoded content segments at the different bitrates based on the calculated CMAF processing metrics corresponding to the received set of CMAF generated encoded content chunks includes transmitting the plurality of subsequent requests for encoded content segments at the different bitrates based on a comparison of the effective buffer framerate and the chunked segment framerate.

4. The system of claim 2 wherein transmitting the plurality of subsequent requests for encoded content segments at the different bitrates based on the calculated CMAF processing metrics corresponding to the received set of CMAF generated encoded content chunks includes requesting an inferior bitrate for the plurality of subsequent requests for encoded content segments if the effective buffer framerate is less than the chunk framerate.

5. The system of claim 2 wherein transmitting the plurality of subsequent requests for encoded content segments at the different bitrates based on the calculated CMAF processing metrics corresponding to the received set of CMAF generated encoded content chunks includes requesting a superior bitrate for the plurality of subsequent requests for encoded content segments if the effective buffer framerate is greater than the chunk framerate.

6. A computer-implemented method to manage processing of encoded content associated with two or more segments, wherein individual segments of the two or more segments are organized into a plurality of fragments, wherein individual fragments of the plurality of fragments are organized into a plurality of chunks, the method comprising:
receiving a set of encoded content chunks at an initial bitrate in response to a content request, the set of encoded content chunks generated according to a common media application format (CMAF) communication protocol;
forming content segments from the set of CMAF generated encoded content chunks; and
managing subsequent requests for encoded segments at different bitrates based on application of CMAF processing metrics corresponding to the received set of CMAF generated encoded content chunks.

7. The computer-implemented method of claim 6 wherein the CMAF processing metrics comprise an effective buffer framerate and a chunked segment framerate.

8. The computer-implemented method of claim 7 wherein the effective buffer framerate corresponds to a quotient of a number of media samples and a measured buffer load time.

9. The computer-implemented method of claim 7 wherein the chunked segment framerate corresponds to a quotient of a count of media samples and a normalized chunk duration.

10. The computer-implemented method of claim 6 wherein forming content segments from the set of CMAF generated encoded content chunks includes storing the received set of encoded chunks in a load buffer.

11. The computer-implemented method of claim 10 wherein forming content segments from the set of CMAF generated encoded content chunks further includes identifying a marker associated with a start of a segment.

12. The computer-implemented method of claim 11 wherein forming content segments from the set of CMAF generated encoded content chunks further includes discarding chunks occurring prior the identified marker and associated with a previous segment.

13. The computer-implemented method of claim 6 wherein applying the CMAF processing metrics corresponding to the set of CMAF generated encoded content chunks includes comparing a content chunk framerate of received CMAF generated encoded content chunks with an effective buffer framerate of transferred formed content segments from a load buffer to a playback buffer.

14. The computer-implemented method of claim 13 further comprising transmitting, based on a determination that the effective buffer framerate is greater than the content chunk framerate, a subsequent request for encoded content segments at a higher bitrate than the initial bitrate.

15. A system to manage streaming content comprising:
a computing device with a processor and memory configured to execute a media processing application, wherein encoded content is associated with two or more segments, individual segments of the two or more segments are organized into a plurality of fragments, and individual fragments of the plurality of fragments are organized into a plurality of chunks, the media processing application configured to:
receive in a load buffer a set of encoded content chunks at an initial bitrate in response to a content request;
determine number of media samples in the set of chunks;
determine a load time from the load buffer to a playback buffer;
determine an effective buffer frame rate based on the determined number of media samples and the determined load time;
determine a chunked segment framerate based on the determined number of media samples and a normalized duration of the media samples in the set of chunks; and
based on a determination that the effective buffer framerate is greater than the chunked segment framerate, transmit a next request for encoded content at a bitrate that is greater than the initial bitrate.

16. The system of claim 15 wherein determining the bitrates for the subsequent requests for the encoded segments based on the comparison of the effective buffer framerate and the chunked segment framerate includes transmitting, based on a determination that the effective buffer framerate is greater than the chunked segment framerate, a next request for encoded content at a bitrate that is greater than the initial bitrate.

17. The system of claim 16 wherein determining the bitrates for the subsequent requests for the encoded segments based on the comparison of the effective buffer framerate and the chunked segment framerate further includes transmitting, based on a determination that the effective buffer framerate is less than the chunked segment framerate, the next request for encoded content at a bitrate that is less than the initial bitrate.

18. The system of claim 15 wherein the media processing application is further configured to determine a duration of the media samples in the set of chunks and apply timescale information to the determined duration to provide the normalized duration.

19. The system of claim 15 wherein the set of encoded content chunks is generated according to a common media application format (CMAF) communication protocol.

20. The system of claim 15 wherein the media processing application is further configured to form content segments from the set of encoded content chunks by writing the set of encoded content chunks in the load buffer, parsing the load buffer to identify a marker in a chunk indicative of information related to an ending portion of a previous segment, and composing the content segments based on the identified marker.

* * * * *